US008908091B2

(12) United States Patent
Yee

(10) Patent No.: US 8,908,091 B2
(45) Date of Patent: *Dec. 9, 2014

(54) ALIGNMENT OF LENS AND IMAGE SENSOR

(71) Applicant: Microsoft Corporation, Redmond, WA (US)

(72) Inventor: Dawson Yee, Medina, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/302,307

(22) Filed: Jun. 11, 2014

(65) Prior Publication Data

US 2014/0293126 A1  Oct. 2, 2014

Related U.S. Application Data

(63) Continuation of application No. 12/563,342, filed on Sep. 21, 2009, now Pat. No. 8,760,571.

(51) Int. Cl.
*H04N 5/225* (2006.01)
*H01L 21/00* (2006.01)
*G01B 11/27* (2006.01)

(52) U.S. Cl.
CPC .............. *H04N 5/2254* (2013.01); *G01B 11/27* (2013.01)
USPC ............................. 348/374; 348/340; 438/64

(58) Field of Classification Search
CPC ............................ H04N 5/2352; H04N 5/2353
USPC .......... 348/374, 340; 250/208.1, 234; 438/64, 438/69
See application file for complete search history.

(56) References Cited

U.S. PATENT DOCUMENTS 4,627,620 A  12/1986 Yang
4,630,910 A  12/1986 Ross et al.
4,645,458 A   2/1987 Williams
(Continued)

FOREIGN PATENT DOCUMENTS

CN  201254344 B   6/2010
EP    0583061 A2   2/1994
(Continued)

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

(Continued)

*Primary Examiner* — Mekonnen Dagnew
(74) *Attorney, Agent, or Firm* — Gregg Wisdom; Judy Yee; Micky Minhas

(57) ABSTRACT

Embodiments related to the alignment of a lens with an image sensor in an optical device are disclosed. For example, one disclosed embodiment comprises an optical device including a printed circuit board, and an image sensor package mounted on the printed circuit board, wherein the image sensor package includes an image sensor. The optical system further comprises a lens holder including a lens, and one or more alignment features arranged on the lens holder. The one or more alignment features are configured to contact the image sensor package to mechanically align the lens holder with the image sensor package.

17 Claims, 3 Drawing Sheets

(56) References Cited

U.S. PATENT DOCUMENTS

| | | | |
|---|---|---|---|
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,872,701 A | 2/1999 | Hayden, Sr. et al. |
| 5,875,108 A | 2/1999 | Hoffberg et al. |
| 5,877,803 A | 3/1999 | Wee et al. |
| 5,913,727 A | 6/1999 | Ahdoot |
| 5,930,383 A * | 7/1999 | Netzer ......................... 382/154 |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,397 B1 | 5/2002 | Takiar et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,756,797 B2 | 6/2004 | Brandorff et al. |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,088,397 B1 * | 8/2006 | Hunter et al. ................. 348/374 |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |

(56) References Cited

U.S. PATENT DOCUMENTS

| | | | |
|---|---|---|---|
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |
| RE42,256 E | 3/2011 | Edwards |
| 7,898,522 B2 | 3/2011 | Hildreth et al. |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 | 12/2011 | Marks |
| 2005/0185088 A1 | 8/2005 | Kale et al. |
| 2007/0212061 A1 | 9/2007 | Woo |
| 2008/0026838 A1 | 1/2008 | Dunstan et al. |
| 2008/0246873 A1 | 10/2008 | Kinoshita |
| 2009/0213262 A1* | 8/2009 | Singh et al. ............... 348/340 |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | 2009069925 A1 | 6/2009 |

OTHER PUBLICATIONS

Miyagawa et al., "CCD-Based Range Finding Sensor", Oct. 1997, pp. 1648-1652, vol. 44 No. 10, IEEE Transactions on Electron Devices.
Rosenhahn et al., "Automatic Human Model Generation", 2005, pp. 41-48, University of Auckland (CITR), New Zealand.
Aggarwal et al., "Human Motion Analysis: A Review", IEEE Nonrigid and Articulated Motion Workshop, 1997, University of Texas at Austin, Austin, TX.
Shao et al., "An Open System Architecture for a Multimedia and Multimodal User Interface", Aug. 24, 1998, Japanese Society for Rehabilitation of Persons with Disabilities (JSRPD), Japan.
Kohler, "Special Topics of Gesture Recognition Applied in Intelligent Home Environments", In Proceedings of the Gesture Workshop, 1998, pp. 285-296, Germany.
Kohler, "Vision Based Remote Control in Intelligent Home Environments", University of Erlangen-Nuremberg/Germany, 1996, pp. 147-154, Germany.
Kohler, "Technical Details and Ergonomical Aspects of Gesture Recognition applied in Intelligent Home Environments", 1997, Germany.
Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.
Qian et al., "A Gesture-Driven Multimodal Interactive Dance System", Jun. 2004, pp. 1579-1582, IEEE International Conference on Multimedia and Expo (ICME), Taipei, Taiwan.
Zhao, "Dressed Human Modeling, Detection, and Parts Localization", 2001, The Robotics Institute, Carnegie Mellon University, Pittsburgh, PA.
He, "Generation of Human Body Models", Apr. 2005, University of Auckland, New Zealand.
Isard et al., "Condensation—Conditional Density Propagation for Visual Tracking", 1998, pp. 5-28, International Journal of Computer Vision 29(1), Netherlands.
Livingston, "Vision-based Tracking with Dynamic Structured Light for Video See-through Augmented Reality", 1998, University of North Carolina at Chapel Hill, North Carolina, USA.
Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.
Breen et al., "Interactive Occlusion and Collusion of Real and Virtual Objects in Augmented Reality", Technical Report ECRC-95-02, 1995, European Computer-Industry Research Center GmbH, Munich, Germany.
Freeman et al., "Television Control by Hand Gestures", Dec. 1994, Mitsubishi Electric Research Laboratories, TR94-24, Caimbridge, MA.
Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.
Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.
Azarbayejani et al., "Visually Controlled Graphics", Jun. 1993, vol. 15, No. 6, IEEE Transactions on Pattern Analysis and Machine Intelligence.
Granieri et al., "Simulating Humans in VR", The British Computer Society, Oct. 1994, Academic Press.
Brogan et al., "Dynamically Simulated Characters in Virtual Environments", Sep./Oct. 1998, pp. 2-13, vol. 18, Issue 5, IEEE Computer Graphics and Applications.
Fisher et al., "Virtual Environment Display System", ACM Workshop on Interactive 3D Graphics, Oct. 1986, Chapel Hill, NC.
"Virtual High Anxiety", Tech Update, Aug. 1995, pp. 22.
Sheridan et al., "Virtual Reality Check", Technology Review, Oct. 1993, pp. 22-28, vol. 96, No. 7.
Stevens, "Flights into Virtual Reality Treating Real World Disorders", The Washington Post, Mar. 27, 1995, Science Psychology, 2 pages.
"Simulation and Training", 1994, Division Incorporated.
"Optical Mouse Sensor", Retrieved at <<http://www.datasheet4u.com/html/A/D/N/ADNS-2610_AvagoTechnologies.pdf.html>>, Jul. 24, 2009, pp. 2.

* cited by examiner

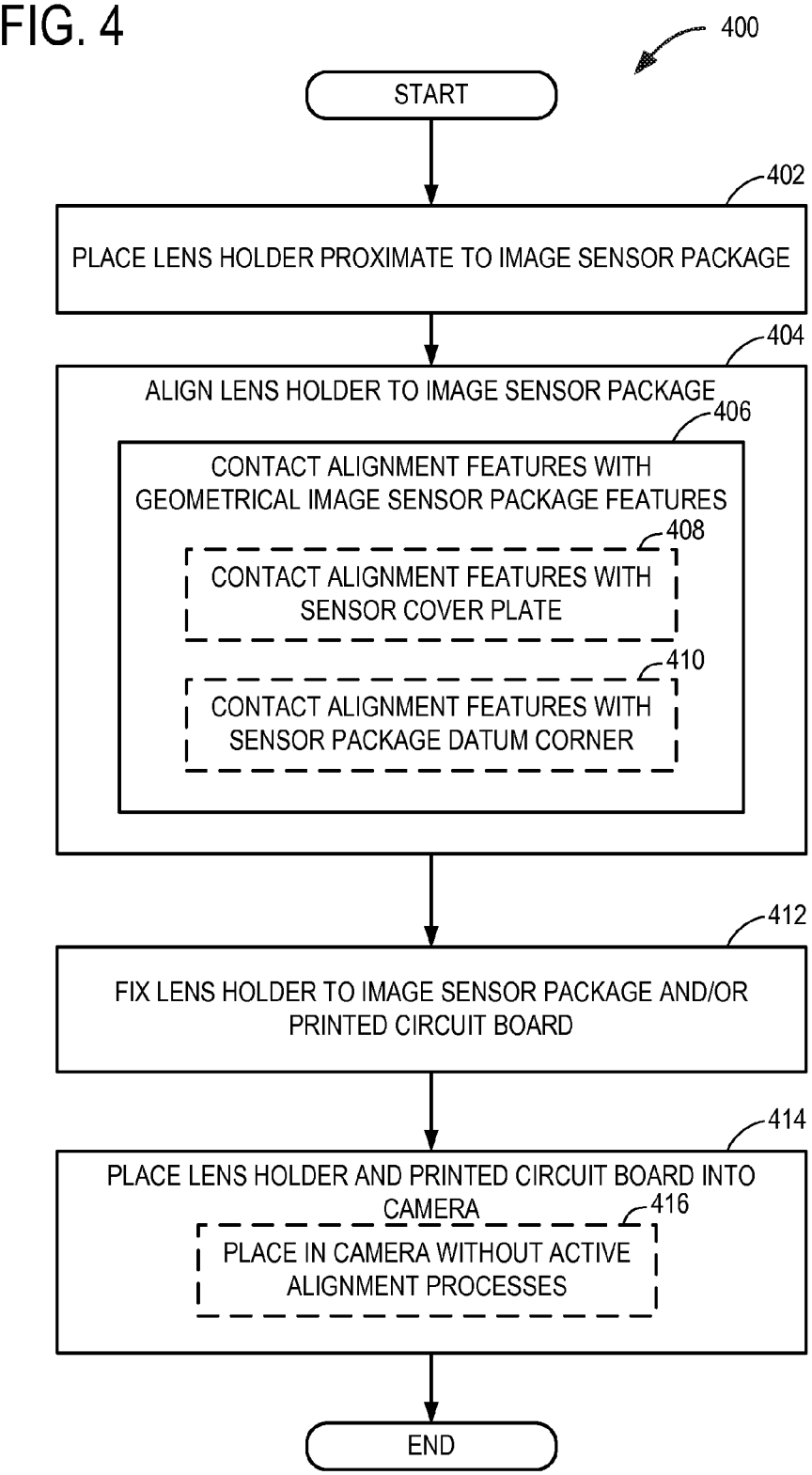

ALIGNMENT OF LENS AND IMAGE SENSOR

CROSS REFERENCE TO RELATED APPLICATIONS

This application is a continuation of U.S. patent application Ser. No. 12/563,342, filed on Sep. 21, 2009, and titled "ALIGNMENT OF LENS AND IMAGE SENSOR" the entire disclosure of which is incorporated by reference.

BACKGROUND

The manufacture of optical devices such as cameras may involve alignment of optical elements that are mounted on a printed circuit board. For example, a lens may be aligned with an image sensor via mounting holes for each of these components on the printed circuit board. However, printed circuit boards may be low-precision parts that are manufactured with loose tolerances. Therefore, in order to ensure proper alignment of optical elements mounted to a printed circuit board, an active alignment process may be utilized such that a position of an optical element is adjusted while the optical system is "live" (i.e. while the image sensor is actively acquiring images).

However, such active alignment may be complex and require a high level of skill, and therefore may lead to increased manufacturing costs. Furthermore, the alignment process may lead to deformation of the circuit board upon which the elements are mounted, thereby negatively affecting the quality of the electronics.

SUMMARY

Accordingly, various embodiments are disclosed herein that relate to aligning optical elements mounted on a printed circuit board. For example, one disclosed embodiment comprises an optical system including a printed circuit board, and an image sensor package mounted on the printed circuit board, where the image sensor package includes an image sensor. The embodiment further comprises a lens holder including a lens, and one or more alignment features arranged on the lens holder. The one or more alignment features are configured to contact the image sensor package to mechanically align the lens holder with the image sensor package.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 is a flowchart illustrating an embodiment of a method for aligning optical components mounted to a printed circuit board.

DETAILED DESCRIPTION

As described above, aligning optical components that are mounted to a printed circuit board may pose various challenges. For example, due to the nature of the printed circuit board manufacturing process, it may be difficult to form mounting holes for a lens and image sensor with desired tolerances, even where a lens holder used to hold the lens and the package for the image sensor are themselves precision parts.

Figure 1:
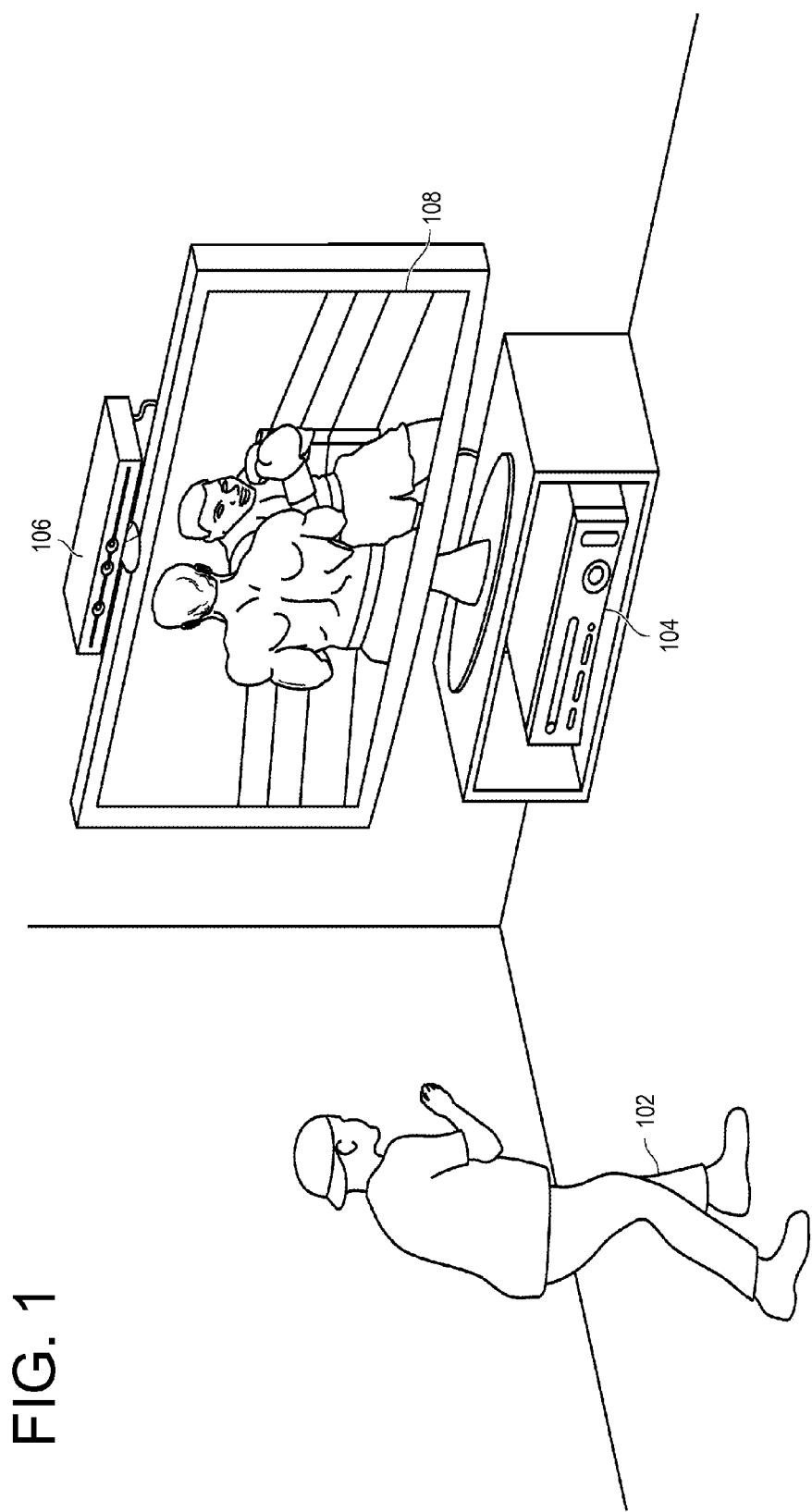
FIG. 1 is a schematic view of an embodiment of a use scenario of a depth-sensing camera.

Therefore, embodiments are disclosed herein that are related to mounting and aligning an image sensor and associated lens holder onto a printed circuit board with sufficient precision that subsequent active alignment steps (e.g. manual adjustment of the lens while the image sensor is live) may be avoided. Before discussing these embodiments, an example optical device is shown in FIG. 1 in the context of a user 102 playing a video game in front of a computing system 104 having an embodiment of a depth-sensing camera 106. Images from the depth-sensing camera 106 may be used by the computing device to detect the user's movements, and to provide transform the movements into graphical movements of an avatar of the player on the display 108. In this manner, the user 102 may control play of the video game through body movements alone, without the use of any hand-held controller or other such device.

Figure 2:
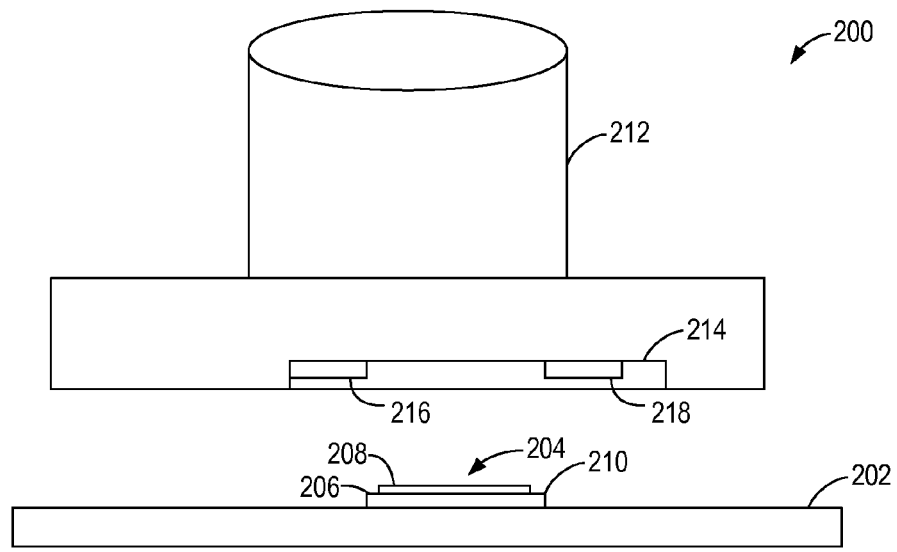
FIG. 2 is a schematic side view of an embodiment of an optical system during a lens holder installation and alignment process.

The depth-sensing camera 106 may include a plurality of optical elements which are aligned in order to detect the user's movements. Such optical elements may include, but are not limited to, an image sensor mounted to a printed circuit board, and a lens or system of lenses to focus an image of the user onto the image sensor. FIG. 2 shows a schematic depiction of an embodiment of such an optical system 200. The depicted optical system 200 includes a printed circuit board (PCB) 202, and an image sensor package 204 mounted on the printed circuit board 202, wherein the image sensor package 204 comprises an image sensor 206. Image sensor 206 may be any suitable type of image sensor, including but not limited to a complementary metal-oxide-semiconductor (CMOS) sensor.

The image sensor package 204 also includes various geometrical sensor package features. For example, the image sensor package 204 may include an image sensor package cover plate 208, and/or a datum corner 210. Such geometric features may be configured to have a precise geometric alignment relative to the image sensor 206. As such, the tolerances of the geometric features of the image sensor package 204 relative to the image sensor 206 may be tighter than the tolerances of the geometric features of printed circuit board that holds the image sensor 206.

Continuing with FIG. 2, a lens holder 212 is shown (e.g., a lens barrel holder), wherein the lens holder includes one or more lenses (not shown). The lens holder 212 also may be constructed with tight geometrical tolerances, such that variation of the position of the lens is very small between lens holders.

In light of the tight geometric tolerances of the lens holder 212 and the image sensor package 204 compared to the printed circuit board 202, a lens may be aligned with an image sensor in a more precise manner where the lens holder 212 references the image sensor package 204 directly, rather than referencing mounting holes in the printed circuit board.

Accordingly, the lens holder 212 comprises alignment features that are configured to contact geometric features of the image sensor package 204 to thereby mechanically align a lens within the lens holder 212 with the image sensor 206 on the image sensor package 204. In this manner, direct contact between parts constructed with tight geometric tolerances is used to align the parts, rather than mutual contact with an intervening structure (printed circuit board) that has looser tolerances.

Any suitable structures may be used as mounting features to facilitate the alignment of the lens holder 212 to the image sensor package 204. For example, in the depicted embodiment, a recessed portion 214 of the lens holder 212 comprises one or more protrusions, such as first protrusion 216 and second protrusion 218, extending from an inside surface of the recessed portion 214, and/or or from an interior side of another suitable portion of the lens holder 212. The protrusions are configured to snugly contact one or more selected geometric features on the image sensor package to thereby align the lens holder (and thus any lenses in the lens holder) with the image sensor package an image sensor. It will be understood that first protrusion 216 and second protrusion 218 are shown for the purpose of example, and that any other suitable alignment feature may be used. For example, instead of a protrusion, an alignment feature may comprise a notch configured to accommodate a complementary geometric feature on the image sensor package.

Figure 3:
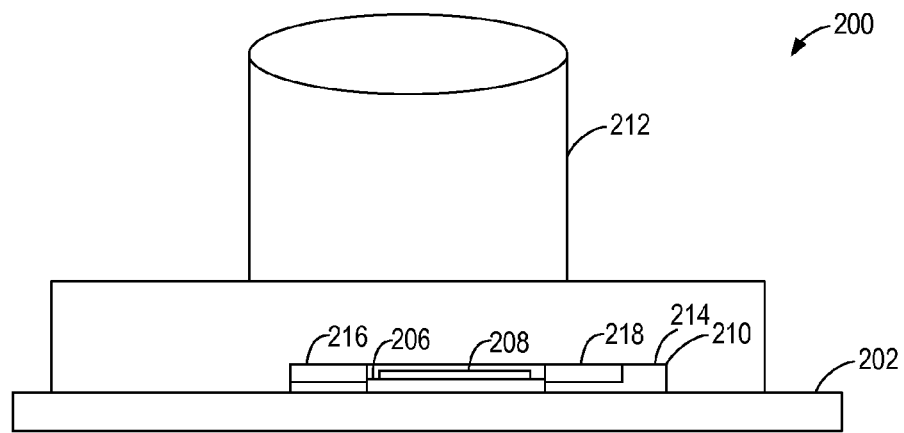
FIG. 3 is a schematic side view of an embodiment of an optical system after installation of the lens holder.

As mentioned above, the alignment features (e.g. first protrusion 216 and second protrusion 218 in the depicted embodiment) are configured to contact the image sensor package 204 to mechanically align the lens holder 212 with the image sensor package 204. This is illustrated in FIG. 3. In this figure, it can be seen that the alignment features of the lens holder 212 are complementary to the geometrical sensor package features of the image sensor package 204 such that the first protrusion 216 and second protrusion 218 fit snugly about the image sensor package 204.

The alignment features may be configured to contact any suitable geometric structures on the image sensor package. For example, in some embodiments, the alignment features may be configured to mechanically align the lens holder 212 by contacting the image sensor package cover plate 208. In other examples, the alignment features may be configured to mechanically align the lens holder 216 by contacting the sensor package datum corner 212, or both the datum corner and the image sensor package cover plate. Further, yet other embodiments may utilize other geometric features of the sensor package cover to align a lens in a lens holder to an image sensor. Additionally, in other embodiments, a lens holder may comprise a recessed portion without protrusions (e.g. where the entirety of the recessed portion is sized to fit snugly over the image sensor package).

The alignment features may be formed in any suitable manner. For example, depending upon how the lens holder 212 is constructed, the alignment features may be machined into the lens holder, cast or molded as a part of the lens holder, or bonded to the lens holder as a separately formed piece. It will be understood that these methods of forming the alignment features are described for the purpose of example, and are not intended to be limiting in any manner FIG. 4 shows an embodiment of a method 400 for aligning a lens holder with an image sensor package mounted on a printed circuit board, where the lens holder includes one or more lenses and one or more alignment features, and the image sensor package includes an image sensor and one or more geometrical sensor package features.

Method 400 comprises, at 402, placing the lens holder proximate to the image sensor package, and then aligning the lens holder to the image sensor package by contacting the one or more alignment features of the lens holders with the one or more geometrical sensor package features at 406. For example, in some embodiments, this may comprise contacting one or more alignment features with an image sensor package cover plate at 408. In other embodiments, this may comprise contacting the one or more alignment features with a sensor package datum corner at 410.

At 412, the method 400 includes fixing the lens holder to one or more of the image sensor package and the printed circuit board. At 414, the method 400 may further include placing the lens holder and printed circuit board into a depth-sensing camera, or a webcam, or in any other suitable optical device. Due to the tight tolerances of the geometrical features of the lens holder and the image sensor package, it will be understood that the lens holder and printed circuit board may be placed into the optical device without performing any additional lens-to-sensor alignment processes, such as active alignment processes, after fixing the lens holder to the image sensor package and/or the printed circuit board. It will be understood that the order of the individual processes of method 400 is presented for the purpose of example, and that the illustrated processes may be performed in any other suitable order. As an example, the lens holder and/or printed circuit board may be placed into a depth-sensing camera before alignment of the lens holder and the image sensor package.

It will further be understood that the configurations and/or approaches for aligning a lens with an image sensor in an optical device described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of any of the above-described processes is not necessarily required to achieve the features and/or results of the embodiments described herein, but is provided for ease of illustration and description.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An optical system, comprising:
a printed circuit board;
an image sensor package mounted on the printed circuit board, the image sensor package including an image sensor; and
a lens holder mounted on the printed circuit board and in contact with the printed circuit board, the lens holder including one or more alignment features that contact the image sensor package and mechanically align the lens holder with the image sensor package, the one or more alignment features comprising a recessed portion of the lens holder having one or more protrusions arranged on an inside surface of the recessed portion, the one or more protrusions extending towards the printed circuit board from the inside surface of the recessed portion, and each protrusion comprising a straight inner edge extending in a direction parallel to a line that forms a first angle with a side of the image sensor package and toward the printed circuit board to an end of the protrusion closest to the printed circuit board, and each protrusion of the one or more protrusions contacting each of one or more sides of the image sensor package along a direction extending toward the printed circuit board while being spaced from the printed circuit board;
wherein the first angle is less than or equal to 90 degrees.

2. The optical system of claim 1, where the one or more alignment features are complementary to one or more geometrical features of the image sensor package.

3. The optical system of claim 1, where the image sensor package includes an image sensor package cover plate, and where the one or more alignment features are configured to mechanically align the lens holder with the image sensor package cover plate.

4. The optical system of claim 1, where the image sensor package comprises a corner, and where the one or more alignment features are configured to mechanically align the lens holder with the corner.

5. The optical system of claim 1, where the optical system comprises a depth-sensing camera.

6. The optical system of claim 1, where the optical system comprises a webcam.

7. A method for aligning a lens holder with an image sensor package mounted on a printed circuit board, the lens holder mounted on the printed circuit board and in contact with the printed circuit board, the lens holder comprising one or more alignment features, the one or more alignment features comprising one or more protrusions located in a recessed portion of the lens holder, the one or more protrusions extending along a direction towards the printed circuit board, each protrusion comprising a straight inner edge extending in a direction parallel to a line that forms a first angle with a side of the image sensor package and toward the printed circuit board to an end of the protrusion closest to the printed circuit board and along the side of the image sensor package, and the image sensor package comprising an image sensor, the method comprising:

placing the lens holder proximate to the image sensor package;

aligning the lens holder to the image sensor package by contacting the straight inner edge of the one or more protrusions in the recessed portion of the lens holder with one or more sides of the image sensor package that extend along a direction toward the printed circuit board such that the lens holder is in contact with the printed circuit board; and fixing the lens holder to the printed circuit board such that the one or more protrusions remain in contact with each of the one or more sides of the image sensor package that extend along the direction toward the printed circuit board and such that the one or more protrusions remained spaced from the printed circuit board; wherein the first angle is less than or equal to 90 degrees.

8. The method of claim 7, where contacting the one or more alignment features with the one or more geometrical sensor package features comprises contacting the one or more alignment features to an image sensor package cover plate.

9. The method of claim 8, further comprising placing the lens holder and printed circuit board into a webcam.

10. The method of claim 7, where contacting the one or more alignment features with the one or more geometrical sensor package features comprises contacting the one or more alignment features to a sensor package corner.

11. The method of claim 7, further comprising placing the lens holder and printed circuit board into a depth-sensing camera.

12. The method of claim 11, further comprising placing the lens holder and printed circuit board into the depth-sensing camera without performing any additional lens-to-image sensor alignment processes after the fixing of the lens holder to the one or more of the image sensor package and the printed circuit board.

13. The method of claim 11, wherein the lens holder and printed circuit board are placed into the depth-sensing camera before fixing the lens holder to the one or more of the image sensor package and the printed circuit board.

14. A camera, comprising:

a printed circuit board;

an image sensor package mounted on a printed circuit board, the image sensor package comprising an image sensor and an image sensor package cover plate, the image sensor package comprising a sensor package corner; and a lens holder mounted on the printed circuit board and in contact with the printed circuit board, the lens holder including one or more alignment features located on an interior side of the lens holder, wherein the one or more alignment features are complementary to one or more of the image sensor package cover plate and the sensor package corner, and wherein the one or more alignment features contact one or more of the image sensor package cover plate and the sensor package corner and mechanically align the lens holder with the image sensor package, the one or more alignment features further comprising a recessed portion of the lens holder, the recessed portion having one or more protrusions arranged on an inside surface, the one or more protrusions extending along a direction extending toward the printed circuit board from the inside surface of the recessed portion, and contacting each of one or more sides of the image sensor package along the direction extending toward the printed circuit board while being spaced from the printed circuit board, each protrusion comprising an inner edge extending in a direction parallel to a line that forms a first angle with a side of the image sensor package and toward the printed circuit board to an end of the protrusion closest to the printed circuit board.

15. The camera of claim 14, wherein the camera is a depth-sensing camera.

16. The camera of claim 14, wherein the camera is a webcam.

17. The camera of claim 14, wherein the inner edge extends in a direction parallel to a line that forms a first angle with a side of the image sensor package and toward the printed circuit board to an end of the protrusion closest to the printed circuit board.

* * * * *